(12) United States Patent
Shildkret (10) Patent No.: US 7,267,137 B1
(45) Date of Patent: Sep. 11, 2007

(54) DEADWEIGHT PRESSURE STANDARDS USING NON-HYSTERESIS SYLPHONS

(76) Inventor: Lev Shildkret, 105-28 65$^{th}$ Ave., #5E, Forest Hills, NY (US) 11375

( * ) Notice: Subject to any disclaimer, the term of this patent is extended or adjusted under 35 U.S.C. 154(b) by 343 days.

(21) Appl. No.: 11/088,716

(22) Filed: Mar. 25, 2005

(51) Int. Cl.
*G01L 27/00* (2006.01)
(52) U.S. Cl. .................... 137/82; 137/84; 73/1.57; 73/1.65; 251/335.3; 92/39
(58) Field of Classification Search .......... 73/1.65; 137/82–86; 251/335.3; 92/34, 37, 39
See application file for complete search history.

(56) References Cited

U.S. PATENT DOCUMENTS

| | | | | |
|---|---|---|---|---|
| 2,992,302 | A | * | 7/1961 | Schuler ............ 200/81.5 |
| 3,688,554 | A | * | 9/1972 | Kipnis et al. ......... 73/1.57 |
| 3,748,891 | A | * | 7/1973 | Music ............... 73/1.57 |

FOREIGN PATENT DOCUMENTS

| | | |
|---|---|---|
| SU | 288358 | 12/1970 |
| SU | 289314 | 12/1970 |
| SU | 932324 | 5/1982 |
| SU | 977964 | 11/1982 |
| SU | 979930 | 12/1982 |
| SU | 1008633 | 3/1983 |
| SU | 1318819 | 6/1987 |

OTHER PUBLICATIONS

L.A. Shildkret, Effects of Air Compressibility on the Effective Area of a Noncylindrical Piston; Izmeritelnaya Tekhnika, No. 2, pp. 35-37, Feb. 1985; Russia.

V.A. Khavaeva, L.A. Shildkret, Instrument Errors of Pressure Setting Mechanisms With Noncylindrical Piston; Izmeritel-Naya Tekhnika, No. 11, pp. 39-40, Nov. 1985; Russia.

M. Bryant et. al, New Way of Accuracy Improvement for the Pneumatic Deadweight Tester V1600; XVII IMECO World Congress Jun. 22-27, 2003; Dubrovnik, Croatia.

Dead Weight Pressure Tester VOZDUKH—1600 Operating And Maintenance Manual Moscow—1994.

(Continued)

*Primary Examiner*—Ramesh Krishnamurthy
(74) *Attorney, Agent, or Firm*—Steven R. Bartholomew, Esq.

(57) ABSTRACT

A deadweight pressure standard provides improved measurement accuracy and repeatability. The standard includes a flow regulator having a first valve controlled by a first pair of non-hysteresis sylphons, and a supply regulator having a second valve controlled by a second pair of non-hysteresis sylphons. The first and second valves achieve an equilibrium state between the supply regulator and the flow regulator. The second valve regulates pressure generated by an applied pressure supply. A mass-to-pressure transducer transforms an applied gravitational force into a reference pressure regulated by the first valve. The center of pressure force on the first pair of non-hysteresis sylphons, and the center of pressure force on the first valve, are exerted along a first reference axis. The center of pressure force on the second pair of non-hysteresis sylphons, and the center of pressure force on the second valve, are exerted along a second reference axis.

20 Claims, 6 Drawing Sheets

OTHER PUBLICATIONS

Advertisement Brochure V16000—V1600 Low Pressure Standards—Pressurements.

S.M. Kesselman, Head of Pressure Laboratory, Russian Research Institute for Metrological Service (VNIIMS) 46, Ozernaya, G-361, Moscow, Russia.

V.N. Gorobei et. al, Comparison of Pneumatic Pressure Tester And State Special Standard of Pressure for Pressure Difference.

A. Miller et al., Report of Calibration, NIST Test 2599529 V261, Dec. 12, 1997.

* cited by examiner

DEADWEIGHT PRESSURE STANDARDS USING NON-HYSTERESIS SYLPHONS

BACKGROUND OF THE INVENTION

1. Field of the Invention

The invention is directed to pressure measurement devices and, more specifically, to novel deadweight pressure standards which utilize non-hysteresis sylphons and one or more non-cylindrical pistons.

2. Description of Related Art

Mechanical pressure sensors have been known for centuries. Although traditional U-tube manometers have been superceded by more sophisticated devices, all pressure sensors require scheduled, periodic maintenance and recalibration. Pressure sensors can be recalibrated in the field or at a calibration laboratory. From the standpoint of accuracy, laboratory calibration is preferred, but often is not possible or necessary. In the laboratory, calibration devices from one or more of the following categories may be employed. The first category includes deadweight testers and U-tube manometers that provide primary, baseline standards. The second category includes laboratory or field standard calibration devices that are periodically recalibrated against the primary standard. Secondary standards are less accurate than the primary standard, but provide a more convenient means for testing and adjusting other instruments.

Figure 1:
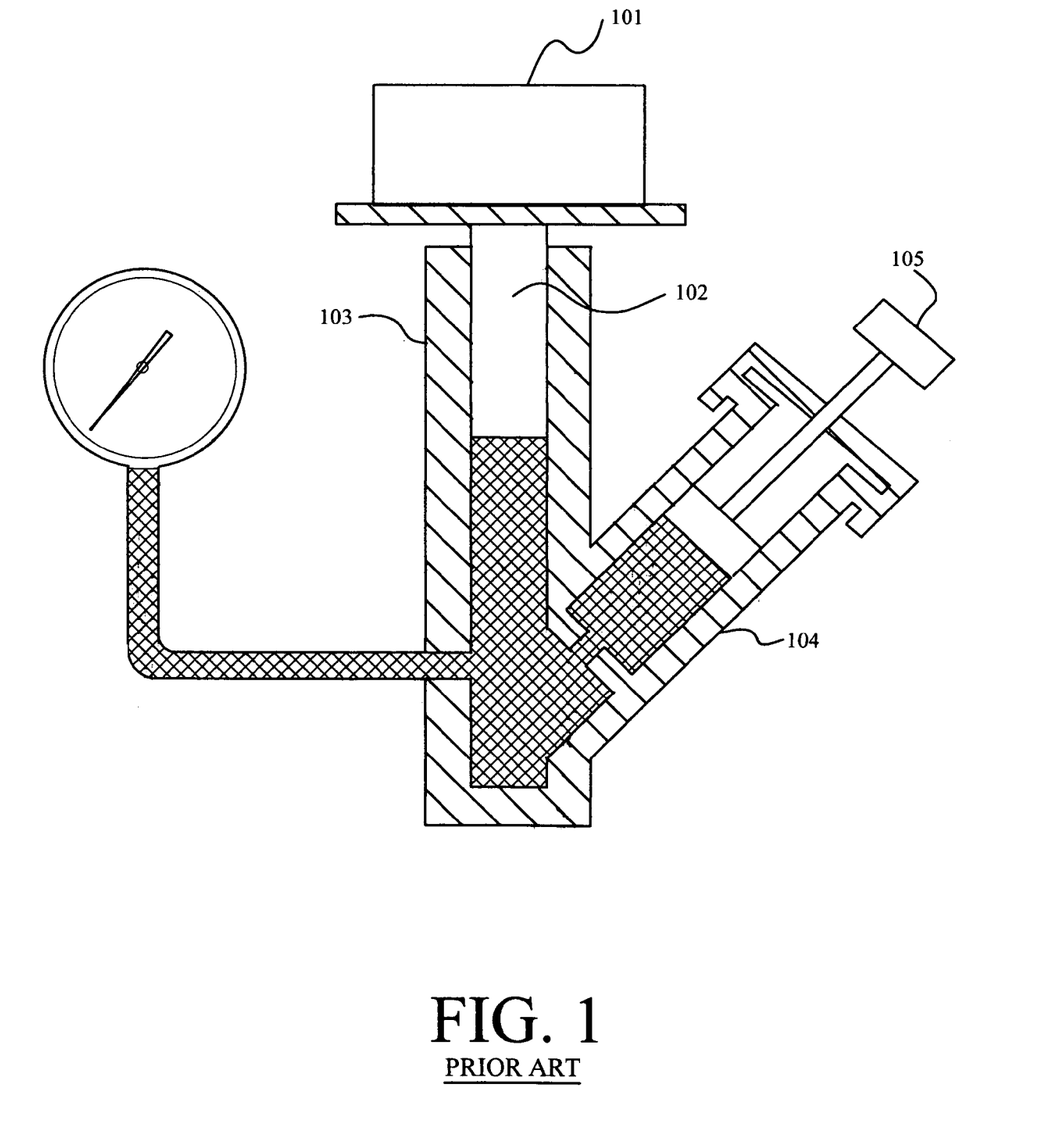
FIG. 1 is a schematic representation of a simplified prior art deadweight tester.

With reference to FIG. 1, a simplified prior art deadweight tester includes a dead weight 101 supported above a primary piston 102. The force of gravity on dead weight 101 causes primary piston 102 to exert a downward force on a fluid in a fluid reservoir 103. A secondary piston 104 is pressed into fluid reservoir 103 by means of a screw 105. Fluid reservoir 103 is coupled to a pressure gauge 106 or transducer under test. Primary piston 102 has a cross-sectional area A, and the weight W of dead weight 101 plus primary piston 102 is selected to correspond to a desired calibration pressure P using the equation P=(W/A). Secondary piston 104 pressurizes the fluid in fluid reservoir 103 by pressing more fluid into the reservoir until dead weight 101 lifts off its support.

In the United States, the National Institute of Standards and Technology (NIST) provides certified weights and calibrates laboratory piston gauges by measuring the diameter of primary piston 102. Deadweight testers can be used to calibrate at pressure levels as low as 5 psig (35 KPa) and as high as 100,000 psig (690 MPa). NIST calibrated deadweight testers can be accurate to 5 parts in 100,000 at pressures below 40,000 psig (280 MPa). For an industrial quality deadweight tester, error is typically 0.1% of span.

Figure 2:
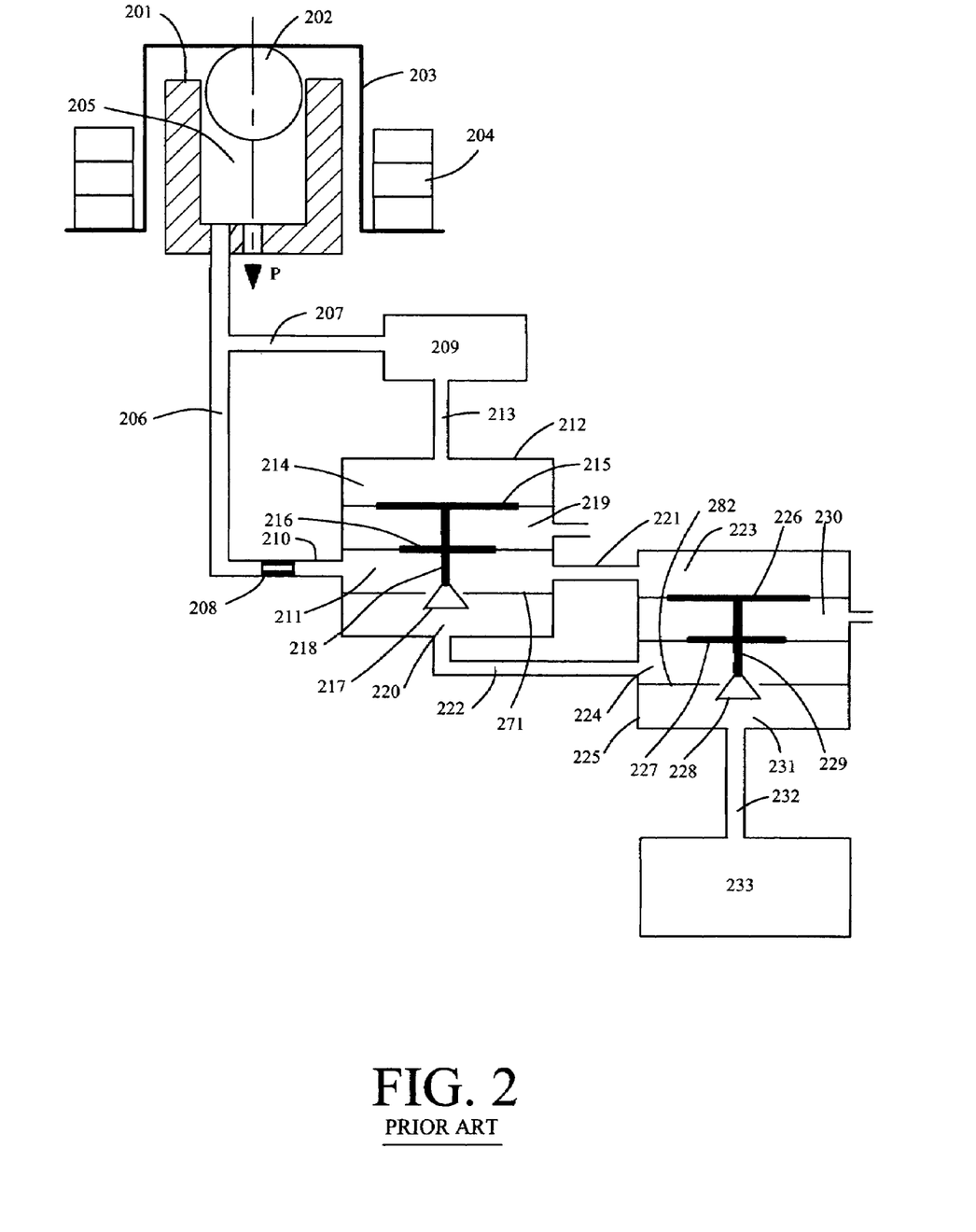
FIG. 2 is a schematic representation of an illustrative prior art deadweight pressure tester that utilizes a noncylindrical piston.

Several techniques have been proposed for improving the accuracy of deadweight pressure testers. Some designs adopt sophisticated temperature compensation schemes, whereas other designs utilize mechanisms for rotating the primary piston in its cylinder along with gas lubrication to negate the effect of friction. Further accuracy enhancements are possible when non-cylindrical pistons are used. An illustrative prior art deadweight pressure tester employing a noncylindrical piston is shown in FIG. 2. This pressure tester is also described in Russian Patent No. 1,008,633.

The prior art deadweight pressure tester of FIG. 2 includes a non-cylindrical piston 202 inside a nozzle 201. Non-cylindrical piston 202 may, but need not, have a substantially spherical configuration. Non-cylindrical piston 202 is tied to suspension 203 and weights 204. An air flow chamber 205 through pipes 206 and 207 is connected to a throttle 208 and volume 209. The throttle 208 is connected to an air flow chamber 211 of an air flow regulator 212 through a pipe 210. A volume 209 is connected to a dead end chamber 214 through a pipe 213.

A first membrane 215 and a second membrane 216 each include non-flexible disks that are fixed, or fastened, or tied, to a first valve 217 through a first rod 218. First valve 217 controls air flow through a first nozzle 271. The effective area of first membrane 215 is greater than the effective area of second membrane 216. A chamber 219 is open to the atmosphere. Air flow chamber 211 is connected to a dead end chamber 223 of a pressure regulator 225 through a pipe 221. An input chamber 220 is connected to an air flow chamber 224 of pressure regulator 225 through a pipe 222.

A third membrane 226 and a fourth membrane 227 each include non-flexible disks that are fixed, or fastened, or tied, to a second valve 228 through a second rod 229. Second valve 228 controls air flow through a second nozzle 282. The effective area of third membrane 226 is greater than the effective area of fourth membrane 227. A chamber 230 is open to the atmosphere. An input chamber 231 is connected to a pressure supply 233 through a pipe 232.

Conceptually, the prior art pressure tester of FIG. 2 transforms gravitational forces exerted on non-cylindrical piston 202, suspension 203 and weights 204 into a pressure P. When pressure supply 233 is applied at pipe 232, a pressure tester output pressure is generated within chamber 205. This output pressure balances the gravity force of non-cylindrical piston 202, suspension 203, and weights 204. When the mass of weights 204 is increased, non-cylindrical piston 202 is forced in a downward direction (towards the earth), and clearance between nozzle 201 and non-cylindrical piston 202 is decreasing. The pressure inside chamber 205 increases to an equilibrium value that is sufficient to balance the greater weight of weights 204.

In order to secure a desired level of high accuracy for the prior art pressure tester of FIG. 2 across a wide range of pressures, it is necessary to maintain the pressure within chamber 220 proportional to the pressure tester's output pressure. Accordingly, pressure regulator 225 provides the function of maintaining a pressure within chamber 220 that is proportional to a desired output pressure. For example, the mass of weights 204 is increased. The pressure within chamber 223 then breaks the equilibrium balance of pressure regulator 225. Second valve 228 moves and, as a result, the pressure within chamber 224 increases until a new equilibrium balance of regulator 225 is achieved. Fluctuations in supply pressure 233 do not affect the accuracy of the pressure tester shown in FIG. 2 because any change in supply pressure is automatically compensated by second valve 228. Volume 209 is employed to dynamically stabilize the operation of the pressure tester of FIG. 2.

Presently existing non-cylindrical deadweight pressure standards have limited stability and accuracy. These shortcomings are caused by dry friction between first valve 217 and first nozzle 271, dry friction between second valve 228 and second nozzle 282, instability of first, second, third and fourth membranes 215, 216, 226, 227 as a function of pressure or time, hysteresis of first, second, third, and fourth membranes 215, 216, 226, 227, and instability of throttle 208 of air flow regulator 212.

SUMMARY OF THE INVENTION

An automatic deadweight pressure standard provides improved measurement accuracy and repeatability. The pressure standard includes a flow regulation mechanism having a flow regulator valve controlled by a first pair of non-hysteresis sylphons, and a supply regulation mechanism having a supply regulator valve controlled by a second pair of non-hysteresis sylphons. The flow regulator valve and the supply regulator valve are controlled so as to achieve a first equilibrium state of pressure balance between the supply regulation mechanism and the flow regulation mechanism. The supply regulator valve automatically regulates pressure generated by an applied pressure supply source. A mass-to-pressure transducer transforms an applied gravitational force into a reference pressure that is generated at least within a pressure chamber. The flow regulator valve automatically regulates the reference pressure generated by the mass-to-pressure transducer. The first pair of non-hysteresis sylphons and the flow regulator valve are arranged such that the center of pressure force on the first pair of non-hysteresis sylphons is exerted substantially along a first reference axis, and the center of pressure force on the flow regulator valve is exerted substantially along the first reference axis. The second pair of non-hysteresis sylphons and the supply regulator valve are arranged such that the center of pressure force on the second pair of non-hysteresis sylphons is exerted substantially along a second reference axis, and the center of pressure force on the supply regulator valve is exerted substantially along the second reference axis. The first reference axis could, but need not, be the same as the second reference axis.

In the first equilibrium state of pressure balance, the supply regulator valve and the flow regulator valve remain substantially at fixed positions. A change in the gravitational force applied to the mass-to-pressure transducer breaks the first equilibrium state of pressure balance between the flow regulation mechanism and the supply regulation mechanism. The first pair of non-hysteresis sylphons causes the flow regulator valve to move in either direction substantially along the reference axis, and the second pair of non-hysteresis sylpons causes the supply regulator valve to move in either direction substantially along the reference axis, until a second equilibrium state of pressure balance of the flow regulation mechanism and the supply regulation mechanism is achieved.

The flow regulator valve is in proximity to a flow regulator nozzle, such that the clearance between the flow regulator valve and the flow regulator nozzle is controlled by the first pair of sylphons. The supply regulator valve is in proximity to a supply regulator nozzle, such that the clearance between the supply regulator valve and the supply regulator nozzle is controlled by the second pair of sylphons. The first pair of sylphons is fixedly linked to the flow regulator valve such that the first pair of sylphons and the flow regulator valve are capable of moving as a single unit. Likewise, the second pair of sylphons is fixedly linked to the supply regulator valve such that the second pair of sylphons and the supply regulator valve are capable of moving as a single unit. Using the first and second pairs of sylphons to control the aforementioned valve clearances substantially eliminates dry friction between the flow regulator valve and the flow regulator nozzle, and substantially eliminates dry friction between the pressure regulator valve and the pressure regulator nozzle. The first and second pairs of sylphons are non-hysteresis sylphons which may, but need not, be implemented using thin metal elements, metal bellows, other types of bellows, diaphragms with collapsible walls, movable diaphragms, expansible chambers, or aneroid capsules.

Pursuant to a further embodiment of the invention, the automatic deadweight pressure standard includes a throttle mechanism having a throttle input chamber and a throttle output chamber. The throttle output chamber is coupled to the flow regulator valve, and the throttle input chamber is coupled to the mass-to-pressure transducer. The throttle mechanism automatically regulates the reference pressure generated by the mass-to-pressure transducer by ensuring that air can only flow from the throttle input chamber to the throttle output chamber. Illustratively, the throttle is configured as a variable throttle with air resistance determined primarily as a function of the position of a throttle wheel. Pursuant to a still further embodiment of the invention, the variable throttle uses a piston-nozzle pair that is substantially similar in shape to a piston-nozzle pair used in the mass-to-pressure transducer.

BRIEF DESCRIPTION OF THE DRAWINGS

Throughout the drawings, like reference numerals are used to designate like components.

DETAILED DESCRIPTION OF THE PREFERRED EMBODIMENTS

Existing non-cylindrical deadweight pressure standards have limited stability and accuracy. As discussed above in connection with FIG. 2, these shortcomings are caused by dry friction between valve-nozzle pairs (such as first valve 217 and first nozzle 271), instability of membranes 215, 216, 226, 227 as a function of time, membrane hysteresis, and instability of the air flow regulator throttle 208. The present invention employs two pairs of non-hysteresis sylphons to provide an automatic deadweight pressure standard having improved measurement accuracy and repeatability.

Figure 3:
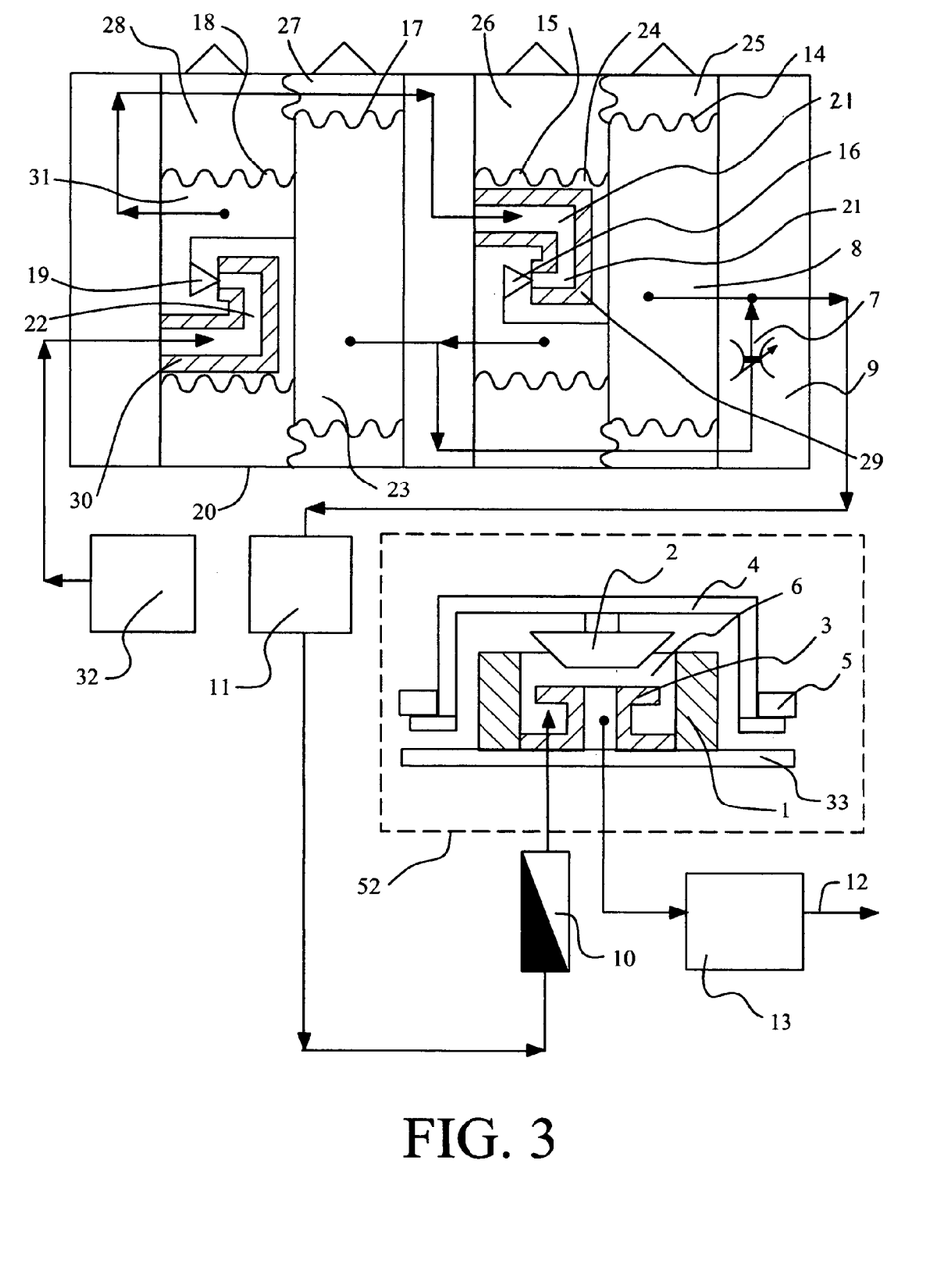
FIG. 3 is a schematic representation of a deadweight pressure standard constructed in accordance with a first embodiment of the present invention.

FIG. 3 is a schematic representation of a deadweight pressure standard for generating a reference pressure in accordance with a first embodiment of the present invention. The deadweight pressure standard includes a supply regulation mechanism 20 for maintaining an equilibrium state of pressure balance with a flow regulation mechanism 9. The supply regulation mechanism 20 uses a supply regulator valve 19 to regulate pressure generated by an applied pressure supply source 32 which must be greater than ambient atmospheric pressure. The flow regulation mechanism 9 uses a flow regulator valve 16 to regulate gaseous pressure generated by a mass-to-pressure transducer 52. The mass-to-pressure transducer 52 is capable of transforming an applied gravitational force into a reference pressure produced at least within a pressure chamber 6.

The equilibrium state of pressure balance is achieved by using a first pair of sylphons 14, 15 to automatically control the flow regulator valve 16, and by using a second pair of sylphons 17, 18 to automatically control the supply regulator valve 19. The supply regulator valve 19 and the flow regulator valve 16 are configured such that the center of pressure force on the supply regulator valve 19 is exerted substantially along the same axis as the center of pressure force on the flow regulator valve 16. A change in the gravitational force applied to mass-to-pressure transducer 52 breaks an existing equilibrium state of pressure balance between the flow regulation mechanism 9 and the supply regulation mechanism 20. The flow regulator valve 16 automatically moves in either direction along the aforementioned axis, and the supply regulator valve 19 automatically moves in either direction along the aforementioned axis, until a new equilibrium state of pressure balance of flow regulation mechanism 9 and supply regulation mechanism 20 is achieved.

The flow regulator valve 16 is in proximity to a flow regulator nozzle 29, such that the clearance between the flow regulator valve 16 and the flow regulator nozzle 29 is controlled by a first pair of sylphons 14, 15. The supply regulator valve 19 is in proximity to a supply regulator nozzle 30, such that the clearance between the supply regulator valve 19 and the supply regulator nozzle 30 is controlled by a second pair of sylphons 17, 18. The first pair of sylphons 14, 15 is fixedly linked to the flow regulator valve 16 such that the first pair of sylphons 14, 15 and the flow regulator valve 16 are capable of moving as a single unit. Likewise, the second pair of sylphons 17, 18 is fixedly linked to the supply regulator valve 19 such that the second pair of sylphons 17, 18 and the supply regulator valve 19 are capable of moving as a single unit. Using the first and second pairs of sylphons 14, 15, 16, 17 to control the aforementioned valve clearances substantially eliminates dry friction between the flow regulator valve 16 and the flow regulator nozzle 29, and substantially eliminates dry friction between the pressure regulator valve 19 and the pressure regulator nozzle 30. The first and second pairs of sylphons 14, 15, 16, 17 are non-hysteresis sylphons which may, but need not, be implemented using thin metal elements, metal bellows, other types of bellows, diaphragms with collapsible walls, movable diaphragms, expansible chambers, or aneroid capsules.

The supply regulator valve 19 regulates gas flow between a first supply regulator chamber 22 and a second supply regulator chamber 31. The flow regulator valve 16 regulates gas flow between a first flow regulator chamber 21 and a second flow regulator chamber 24. The first supply regulator chamber 22 is connected to the pressure supply source 32. The second supply regulator chamber 31 is connected to the first flow regulator chamber 21. The second flow regulator chamber 24 is connected to a third supply regulator chamber 23. The second flow regulator chamber 24 is coupled to the pressure chamber 6 of the mass-to-pressure transducer 52 through a throttle 7, a volume 11, and a gas flow meter 10. A third flow regulator chamber 8 is coupled to the pressure chamber 6.

The first pair of sylphons 14, 15 is controlled by gas pressure in the second flow regulator chamber 24 relative to gas pressure in the third flow regulator chamber 8. The second pair of sylphons 17, 18 is controlled by gas pressure in the second supply regulator chamber 31 relative to gas pressure in the third supply regulator chamber 23. In the embodiment of FIG. 3, a fourth flow regulator chamber 25, a fifth flow regulator chamber 26, a fourth supply regulator chamber 27, and a fifth supply regulator chamber 28 are open to ambient atmospheric pressure.

The mass-to-pressure transducer 52 comprises a piston 2 in proximity to a transducer nozzle 1. The pressure chamber 6 includes an insert 3. The piston 2 is connected to a suspension 4 capable of supporting one or more applied reference weights 5. Preferably, the piston 2 is a non-cylindrical piston. Piston 2 may, but need not, have a spherical shape or (as shown) a wedge shape. The transducer nozzle 1 and the insert 3 are hermetically attached to a base 33. The transducer nozzle 1 and piston 2 regulate gas flow between the pressure chamber 6 and ambient atmospheric pressure. The gas flow between the piston 2 and the transducer nozzle 1 is determined by gas pressure in the pressure chamber 6 relative to the applied reference weights 5. The pressure chamber 6 is connected to a volume 13, from which the output of the automatic deadweight pressure standard is taken. The volumes 11 and 13 are employed to provide dynamic stability.

When pressure supply source 32 is applied to the automatic deadweight pressure standard, a first clearance between the flow regulator valve 16 and the flow regulator nozzle 29, a second clearance between the supply regulator valve 19 and the supply regulator nozzle 30, and a third clearance between the piston 2 and the transducer nozzle 1 are all determined as a function of equal mass gas flow through the second supply regulator chamber 31, the first supply regulator chamber 22, the first flow regulator chamber 21, the second flow regulator chamber 24, the third supply regulator chamber 23, the third flow regulator chamber 8, and the pressure chamber 6. Likewise, the dimensions of the first pair of sylphons 14, 15, the second pair of sylphons 17, 18, the flow regulator valve 16, the flow regulator nozzle 29, the pressure regulator valve 19, and the pressure regulator nozzle 30 are determined as a function of equal mass gas flow through the deadweight pressure standard of FIG. 3. More specifically, the effective areas of the first pair of sylphons 14, 15 and the second pair of sylphons 17, 18 are determined with reference to the following equation:

$$\frac{F_{14}}{F_{15}} - \frac{F_{17}}{F_{18}} = K \approx 1.225$$

The areas of nozzles 29 and 30 are determined with reference to the following equation:

$$F_{29} = F_{30} << F_{15} = F_{18}$$

Figure 4:
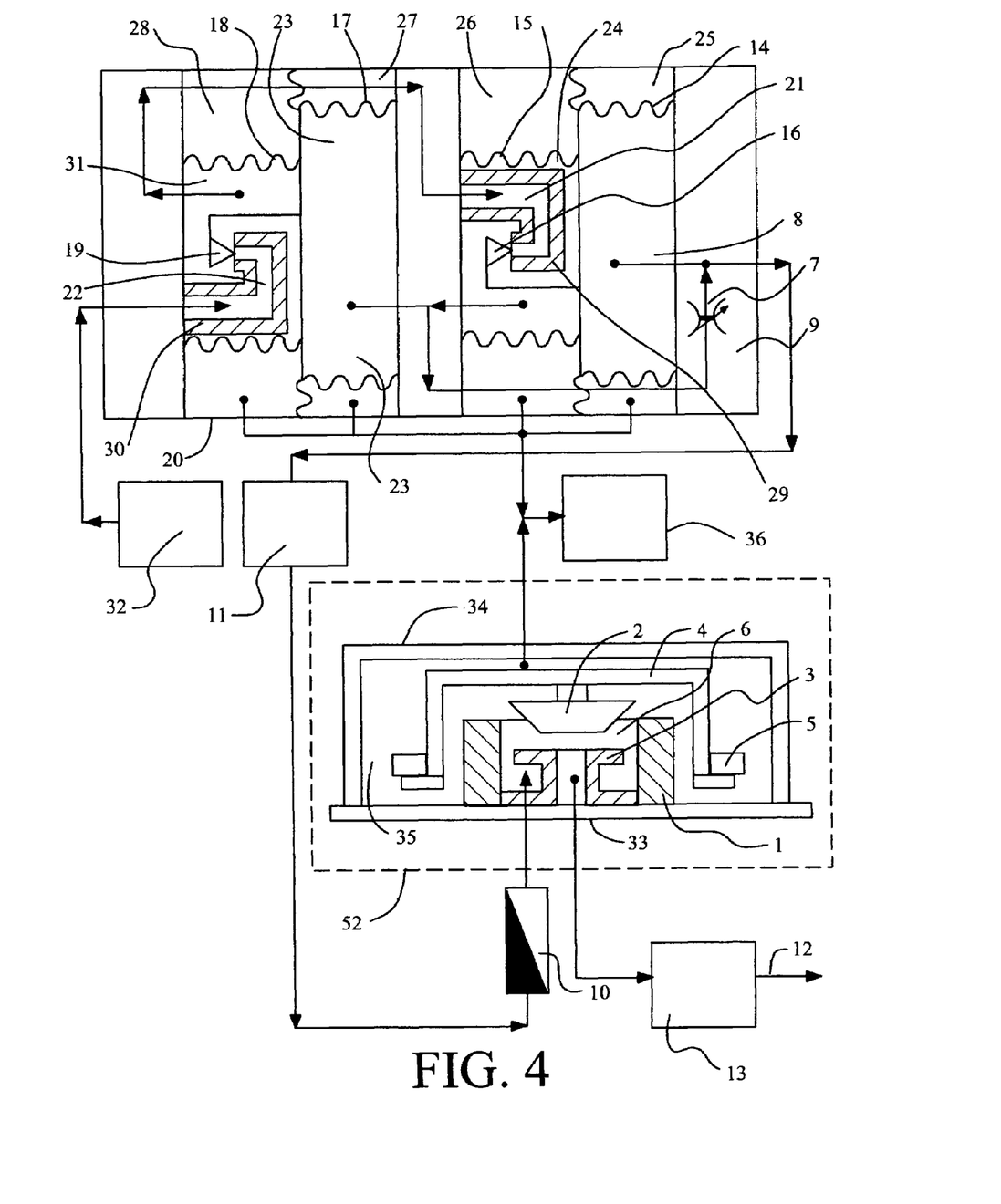
FIG. 4 is a schematic representation of an absolute pressure standard constructed in accordance with a second embodiment of the present invention.

Refer now to FIG. 4, which is a schematic representation of an absolute pressure standard constructed in accordance with a second embodiment of the present invention. The absolute pressure standard of FIG. 4 is substantially similar to the deadweight pressure standard of FIG. 3, with the following distinctions. The absolute pressure standard of FIG. 4 is provided with a cover 34 that is hermetically sealed to the base 33 of the mass-to-pressure transducer 52. A sealed chamber 35, formed between the base 33 and the cover 34, is connected with the fourth flow regulator chamber 25, the fifth flow regulator chamber 26, the fourth supply regulator chamber 27, and the fifth supply regulator chamber 28. Recall that, in the embodiment of FIG. 3, the foregoing chambers 25, 26, 27, 28 were open to ambient atmospheric pressure. However, in the embodiment of FIG. 4, a vacuum pump 36 is applied to the interconnected chambers 25, 26, 27, 28 and the sealed chamber 35. The absolute pressure created by application of the vacuum pump 36 is determined by the equation:

$$P_a = \left\{ \frac{m*g}{F_e} * [1 - Q_R/Q_M] \right\} + P_R$$

where:
- m=mass of reference weights 5, suspension 4, and piston 2 of the mass-to-pressure transducer;
- g=local gravity;
- $Q_R$=density of gas under reference pressure;
- $Q_M$=density of material which is used in mass standard and/or in mass to pressure transducer;
- Fe=effective area of piston 2–transducer nozzle 1 pair under pressure $P_a$;
- $P_R$=reference pressure.

Figure 5:
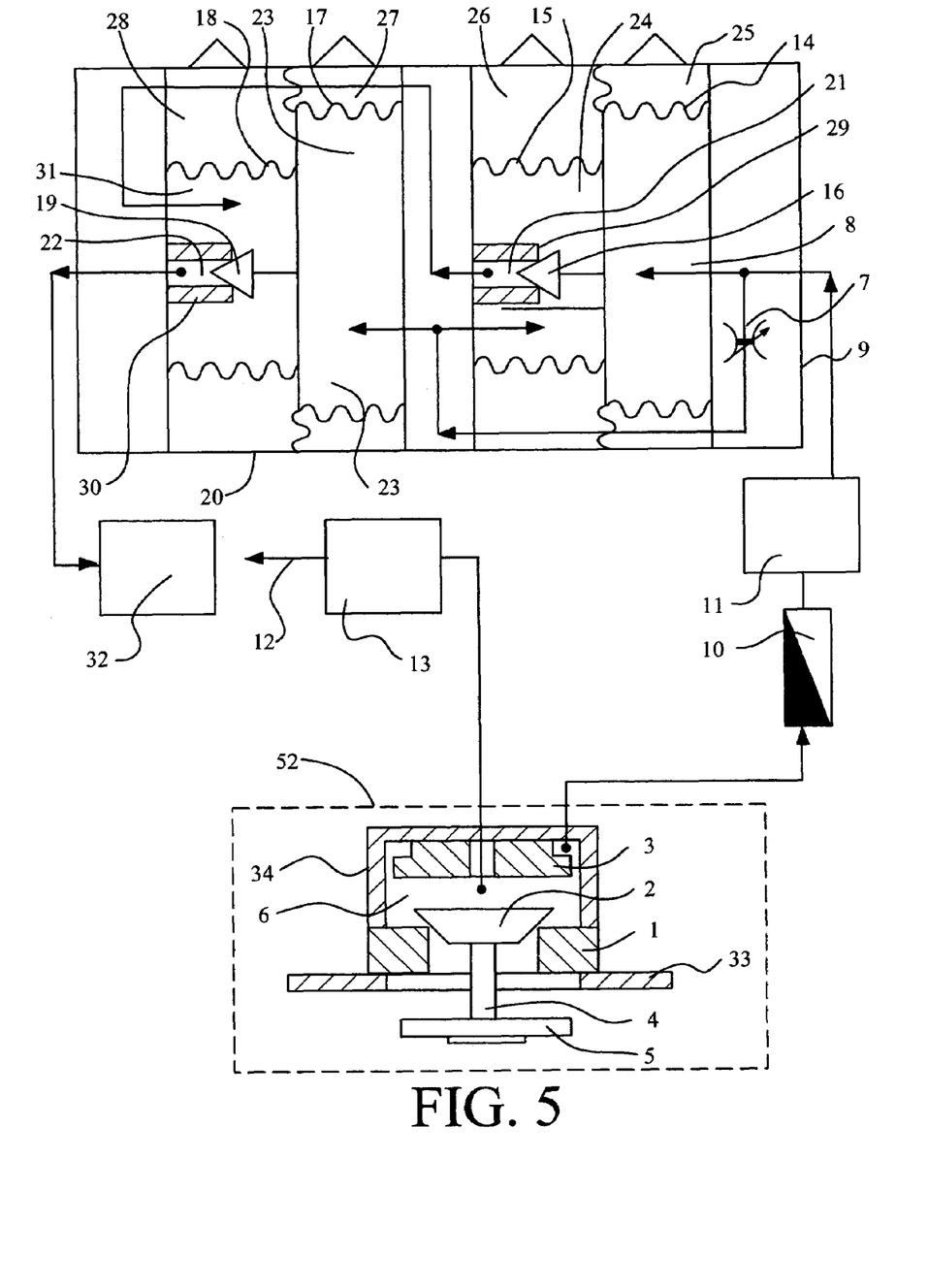
FIG. 5 is a schematic representation of a vacuum pressure standard constructed in accordance with a third embodiment of the present invention.

FIG. 5 is a schematic representation of a vacuum pressure standard constructed in accordance with a third embodiment of the present invention. The vacuum pressure standard of FIG. 5 is substantially similar to the deadweight pressure standard of FIG. 3, with the following distinctions. First, the orientations of the flow regulator valve 16, the flow regulator nozzle 29, the supply regulator valve 19 and the supply regulator nozzle 30 are rotated by 180 degrees within the plane of FIG. 3, resulting in the configuration of FIG. 5. Second, a vacuum pump or ejector is applied as the pressure supply source 32. Finally, the pressure chamber 6 is formed by the transducer nozzle 1, the piston 2, the insert 3, and the cover 34, such that the cover 34 is hermetically sealed to the transducer nozzle 1.

Figure 6:
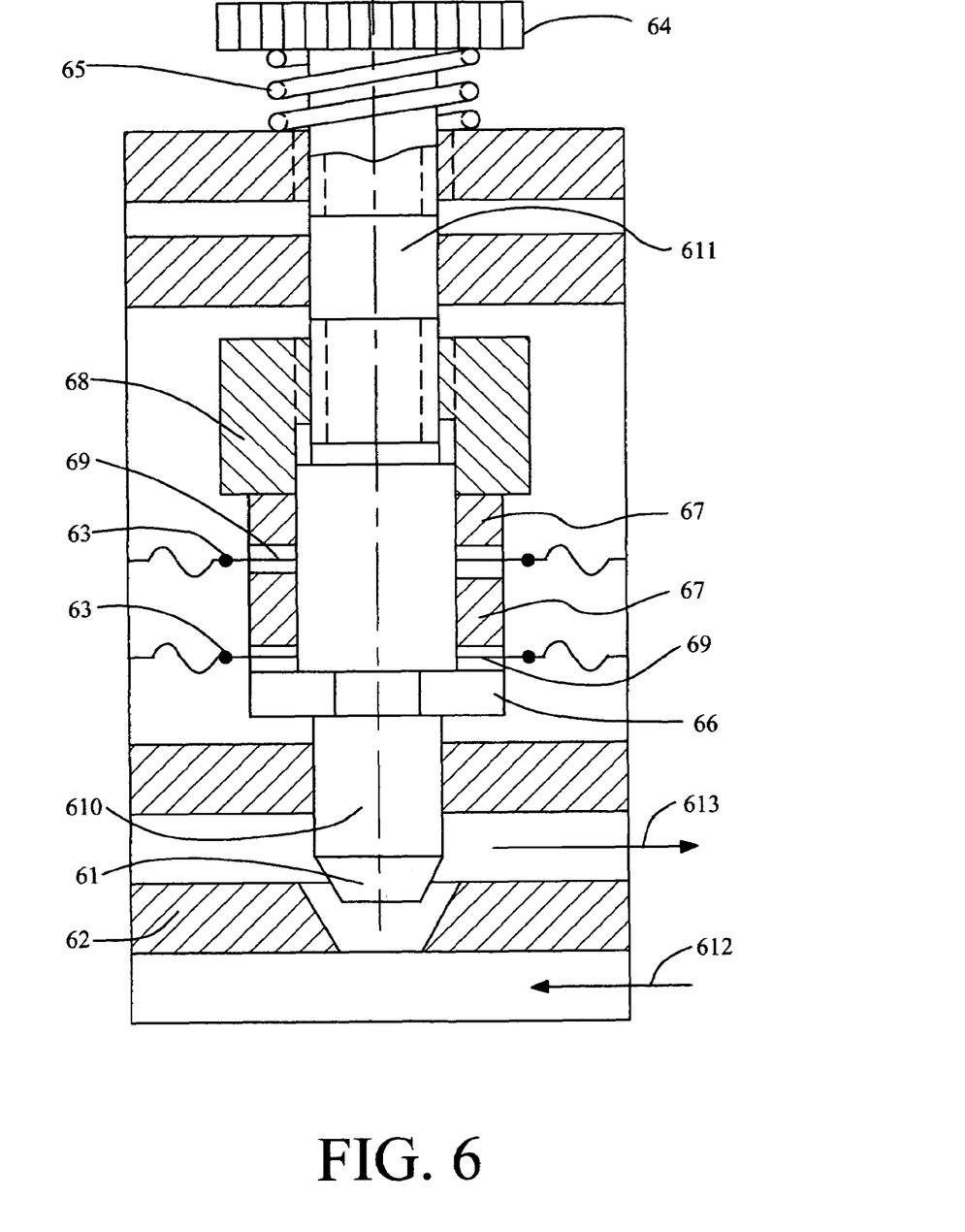
FIG. 6 is a schematic representation of an exemplary throttle for use with any of the pressure standards shown in FIGS. 3-5.

FIG. 6 is a schematic representation of an exemplary throttle 7 for use with any of the pressure standards shown in FIGS. 3-5. The throttle 7 includes a needle 61, a nozzle 62, a pair of membranes 63, a wheel 64 fixedly mounted to the needle 61, a spring 65, a hermetically sealable lock formed by a bolt 66, a pair of cylinders 67, a nut 68, and two pairs of ribbon washers 69. The needle 61 is movably mounted within two hollow sleeves in the form of a first concentric cylinder 610 and a second concentric cylinder 611, such that there is some mechanical clearance between the needle 61 and the interior surfaces of the first cylinder 610 and the second cylinder 611. The pair of membranes 63 is implemented using two virtually identical membranes, so as to achieve concentric mechanical clearance between the nozzle 62 and the needle 61. The spring 65 enhances the stability of the mechanical clearances within the throttle 7. An input chamber 612 is used as the input of the throttle 7, and the output of the throttle 7 is provided using an output chamber 613. The input chamber 612 is connected to second flow regulator chamber 24 and third pressure regulator chamber 23 (FIGS. 3-5). The output chamber 613 (FIG. 6) is connected to third flow regulator chamber 8 (FIGS. 3-5).

The configuration of the throttle 7 (FIG. 6) ensures that gas can only flow from the input chamber 612 to the output chamber 613. The throttle 7 functions as a variable throttle, and is designed in such a way that the clearance between the nozzle 62 and the needle 61 is solely determined by the position of the wheel 64. Pursuant to a further embodiment of the invention, the shape of the nozzle 62-needle 61 clearance is virtually identical to the shape of the clearance between the piston 2 and the nozzle 1 (FIGS. 3-5).

The deadweight pressure standard of FIG. 3, the absolute pressure standard of FIG. 4, and the vacuum pressure standard of FIG. 5 all operate in a similar manner. When pressure is applied to pressure supply source 32, a first reference pressure is generated in pressure chamber 6. This first reference pressure balances gravitational forces exerted on the piston 2 and the suspension 4 by the applied reference weights 5. If these gravitational forces remain unchanged, a first equilibrium state of pressure balance is achieved between the supply regulation mechanism 20 and the flow regulation mechanism 9. The supply regulator valve 19 of supply regulation mechanism 20 and the flow regulator valve 16 of flow regulation mechanism 9 remain at substantially fixed positions.

If the mass of the applied reference weights 5 is changed, for example, by adding more weight, the piston 2 is forced in a downward direction towards the surface of the earth, thereby causing the clearance between nozzle 1 and the piston 2 to decrease. This decreased clearance disrupts the first equilibrium state of pressure balance between the supply regulation mechanism 20 and the flow regulation mechanism 9. The supply regulator valve 19 of supply regulation mechanism 20 and the flow regulator valve 16 of flow regulation mechanism 9 automatically adjust by moving in either direction substantially along the same axis until a new, second equilibrium state of pressure balance is achieved. The pressure inside the pressure chamber 6 increases from the first reference pressure up to a second reference pressure that is sufficient to achieve the second equilibrium state of pressure balance with the higher mass of the applied reference weights 5.

Next, assume that the mass of the applied reference weights 5 is decreased. The piston 2 is rising in an upward direction away from the surface of the earth, increasing the clearance between the nozzle 1 and the piston 2. Thus, the pressure inside the pressure chamber 6 is decreasing from the second reference pressure down to a third reference pressure that is sufficient to achieve a third equilibrium state of pressure balance with the lower mass of the applied reference weights 5.

To secure the high accuracy of the devices shown in FIGS. 3-5 across a wide range of reference pressures, it is necessary to maintain the pressure inside the second flow regulator chamber 24 substantially proportional to the output reference pressure generated in the pressure chamber 6. This functionality is performed by the flow regulation mechanism 9. For example, the mass of weights 5 is increased. The pressure inside the third flow regulator chamber 8 breaks an existing equilibrium state of pressure balance between the flow regulation mechanism 9 and the pressure regulation mechanism 20. The flow regulator valve 16 and the supply regulator valve 19 move and, as a result, the pressures inside the first flow regulator chamber 21, the second supply regulator chamber 31, and the third supply regulator chamber 23 increases until a new equilibrium state of pressure balance of regulators 9 and 20 is achieved.

Fluctuations in the pressure of pressure supply source 32 do not affect the accuracy of the deadweight pressure standard of FIG. 3, nor do such fluctuations affect the accuracy of the absolute pressure standard of FIG. 4 or the accuracy of the vacuum pressure standard of FIG. 5. Supply valve 19 automatically compensates for any change in supply pressure.

Although several particular embodiments of the present invention have been described in detail, various modifications thereto will be readily apparent to individuals with ordinary skill in the art. Thus, while certain novel features of the invention have been shown and described as applied to several preferred embodiments thereof, it will be understood that various omissions and substitutions and changes in the form and details of the devices illustrated, and in their operation, may be made by those skilled in the art without departing from the spirit and scope of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An automatic deadweight pressure standard comprising:
   a flow regulation mechanism having a flow regulator valve controlled by a first pair of non-hysteresis sylphons;
   a supply regulation mechanism having a supply regulator valve controlled by a second pair of non-hysteresis sylphons, the supply regulator valve automatically regulating pressure generated by an applied pressure supply source; and
   a mass-to-pressure transducer for transforming an applied gravitational force into a reference pressure that is generated at least within a pressure chamber;
   wherein the flow regulator valve automatically regulates the reference pressure generated by the mass-to-pressure transducer;
   wherein the flow regulator valve and the supply regulator valve are controlled so as to achieve an initial equilibrium state of pressure balance between the supply regulation mechanism and the flow regulation mechanism;
   wherein the first pair of non-hysteresis sylphons and the flow regulator valve are arranged such that a center of pressure force on the first pair of non-hysteresis sylphons is exerted substantially along a first reference axis, and a center of pressure force on the flow regulator valve is exerted substantially along the first reference axis;
   wherein the second pair of non-hysteresis sylphons and the supply regulator valve are arranged such that a center of pressure force on the second pair of non-hysteresis sylphons is exerted substantially along a second reference axis, and a center of pressure force on the supply regulator valve is exerted substantially along the second reference axis; and
   wherein the first reference axis could, but need not, be the same as the second reference axis.

2. The automatic deadweight pressure standard of claim 1 wherein, in the initial equilibrium state of pressure balance, the supply regulator valve and the flow regulator valve remain substantially at fixed positions.

3. The automatic deadweight pressure standard of claim 2 wherein a change in the applied gravitational force breaks the initial equilibrium state of pressure balance between the flow regulation mechanism and the supply regulation mechanism, such that the first pair of non-hysteresis sylphons causes the flow regulator valve to move in either direction substantially along the first reference axis, and the supply regulator valve automatically moves in either direction substantially along the second reference axis, until a new equilibrium state of pressure balance of the flow regulation mechanism and the supply regulation mechanism is achieved.

4. The automatic deadweight pressure standard of claim 1 wherein the flow regulator valve is in proximity to a flow regulator nozzle, such that the clearance between the flow regulator valve and the flow regulator nozzle is controlled by the first pair of non-hysteresis sylphons, and the supply regulator valve is in proximity to a supply regulator nozzle, such that the clearance between the supply regulator valve and the supply regulator nozzle is controlled by the second pair of non-hysteresis sylphons.

5. The automatic deadweight pressure standard of claim 4 wherein the first pair of non-hysteresis sylphons is fixedly linked to the flow regulator valve such that the first pair of non-hysteresis sylphons and the flow regulator valve are capable of moving as a single unit, and the second pair of non-hysteresis sylphons is fixedly linked to the supply regulator valve such that the second pair of non-hysteresis sylphons and the supply regulator valve are capable of moving as a single unit, whereby using the first and second pairs of non-hysteresis sylphons to control the aforementioned valve clearances substantially eliminates dry friction between the flow regulator valve and the flow regulator nozzle, and substantially eliminates dry friction between the pressure regulator valve and the pressure regulator nozzle.

6. The automatic deadweight pressure standard of claim 5 wherein the first and second pairs of non-hysteresis sylphons are implemented using at least one of thin metal elements, bellows, membranes, diaphragms with collapsible walls, movable diaphragms, expansible chambers, or aneroid capsules.

7. The automatic deadweight pressure standard of claim 1 further comprising a throttle mechanism having a throttle input chamber and a throttle output chamber, the throttle output chamber being coupled to the flow regulator valve, the throttle input chamber being coupled to the mass-to-pressure transducer; wherein the throttle mechanism automatically regulates the reference pressure generated by the mass-to-pressure transducer by ensuring that air can only flow from the throttle input chamber to the throttle output chamber.

8. The automatic deadweight pressure standard of claim 7, the throttle mechanism further comprising a needle, a nozzle, and an adjustment wheel for adjusting a clearance between the needle and the nozzle, such that the throttle mechanism functions as a variable throttle, and such that the clearance between the nozzle and the needle is determined as a function of wheel position; wherein the variable throttle uses a piston-nozzle pair that is substantially similar in shape to a piston-nozzle pair used in the mass-to-pressure transducer.

9. An automatic absolute pressure standard comprising:
   a flow regulation mechanism having a flow regulator valve controlled by a first pair of non-hysteresis sylphons;
   a supply regulation mechanism having a supply regulator valve controlled by a second pair of non-hysteresis sylphons, the supply regulator valve automatically regulating pressure generated by an applied pressure supply source; and
   a mass-to-pressure transducer for transforming an applied gravitational force into a reference pressure that is generated at least within a pressure chamber;
   wherein the flow regulator valve automatically regulates the reference pressure generated by the mass-to-pressure transducer;
   wherein the flow regulator valve and the supply regulator valve are controlled so as to achieve an initial equilibrium state of pressure balance between the supply regulation mechanism and the flow regulation mechanism;

wherein the first pair of non-hysteresis sylphons and the flow regulator valve are arranged such that a center of pressure force on the first pair of non-hysteresis sylphons is exerted substantially along a first reference axis, and a center of pressure force on the flow regulator valve is exerted substantially along the first reference axis;

wherein the second pair of non-hysteresis sylphons and the supply regulator valve are arranged such that a center of pressure force on the second pair of non-hysteresis sylphons is exerted substantially along a second reference axis, and a center of pressure force on the supply regulator valve is exerted substantially along the second reference axis; and wherein the first reference axis could, but need not, be the same as the second reference axis.

10. The automatic absolute pressure standard of claim 9 wherein, in the initial equilibrium state of pressure balance, the supply regulator valve and the flow regulator valve remain substantially at fixed positions.

11. The automatic absolute pressure standard of claim 10 wherein a change in the applied gravitational force breaks the initial equilibrium state of pressure balance between the flow regulation mechanism and the supply regulation mechanism, such that the first pair of non-hysteresis sylphons causes the flow regulator valve to move in either direction substantially along the first reference axis, and the supply regulator valve automatically moves in either direction substantially along the second reference axis, until a new equilibrium state of pressure balance of the flow regulation mechanism and the supply regulation mechanism is achieved.

12. The automatic absolute pressure standard of claim 9 wherein the flow regulator valve is in proximity to a flow regulator nozzle, such that the clearance between the flow regulator valve and the flow regulator nozzle is controlled by the first pair of non-hysteresis sylphons, and the supply regulator valve is in proximity to a supply regulator nozzle, such that the clearance between the supply regulator valve and the supply regulator nozzle is controlled by the second pair of non-hysteresis sylphons.

13. The automatic absolute pressure standard of claim 12 wherein the first pair of non-hysteresis sylphons is fixedly linked to the flow regulator valve such that the first pair of non-hysteresis sylphons and the flow regulator valve are capable of moving as a single unit, and the second pair of non-hysteresis sylphons is fixedly linked to the supply regulator valve such that the second pair of non-hysteresis sylphons and the supply regulator valve are capable of moving as a single unit, whereby using the first and second pairs of non-hysteresis sylphons to control the aforementioned valve clearances substantially eliminates dry friction between the flow regulator valve 16 and the flow regulator nozzle, and substantially eliminates dry friction between the pressure regulator valve and the pressure regulator nozzle.

14. The automatic absolute pressure standard of claim 13 wherein the first and second pairs of non-hysteresis sylphons are implemented using at least one of thin metal elements, bellows, membranes, diaphragms with collapsible walls, movable diaphragms, expansible chambers, or aneroid capsules.

15. An automatic vacuum pressure standard comprising:

a flow regulation mechanism having a flow regulator valve controlled by a first pair of non-hysteresis sylphons;

a supply regulation mechanism having a supply regulator valve controlled by a second pair of non-hysteresis sylphons, the supply regulator valve automatically regulating pressure generated by an applied pressure supply source; and a mass-to-pressure transducer for transforming an applied gravitational force into a reference pressure that is generated at least within a pressure chamber;

wherein the flow regulator valve automatically regulates the reference pressure generated by the mass-to-pressure transducer;

wherein the flow regulator valve and the supply regulator valve are controlled so as to achieve an initial equilibrium state of pressure balance between the supply regulation mechanism and the flow regulation mechanism;

wherein the first pair of non-hysteresis sylphons and the flow regulator valve are arranged such that a center of pressure force on the first pair of non-hysteresis sylphons is exerted substantially along a first reference axis, and a center of pressure force on the flow regulator valve is exerted substantially along the first reference axis;

wherein the second pair of non-hysteresis sylphons and the supply regulator valve are arranged such that a center of pressure force on the second pair of non-hysteresis sylphons is exerted substantially along a second reference axis, and a center of pressure force on the supply regulator valve is exerted substantially along the second reference axis; and wherein the first reference axis could, but need not, be the same as the second reference axis.

16. The automatic vacuum pressure standard of claim 15 wherein, in the initial equilibrium state of pressure balance, the supply regulator valve and the flow regulator valve remain substantially at fixed positions.

17. The automatic vacuum pressure standard of claim 16 wherein a change in the applied gravitational force breaks the initial equilibrium state of pressure balance between the flow regulation mechanism and the supply regulation mechanism, such that the first pair of non-hysteresis sylphons causes the flow regulator valve to move in either direction substantially along the first reference axis, and the supply regulator valve automatically moves in either direction substantially along the second reference axis, until a new equilibrium state of pressure balance of the flow regulation mechanism and the supply regulation mechanism is achieved.

18. The automatic vacuum pressure standard of claim 15 wherein the flow regulator valve is in proximity to a flow regulator nozzle, such that the clearance between the flow regulator valve and the flow regulator nozzle is controlled by the first pair of non-hysteresis sylphons, and the supply regulator valve is in proximity to a supply regulator nozzle, such that the clearance between the supply regulator valve and the supply regulator nozzle is controlled by the second pair of non-hysteresis sylphons.

19. The automatic vacuum pressure standard of claim 18 wherein the first pair of non-hysteresis sylphons is fixedly linked to the flow regulator valve such that the first pair of non-hysteresis sylphons and the flow regulator valve are capable of moving as a single unit, and the second pair of non-hysteresis sylphons is fixedly linked to the supply regulator valve such that the second pair of non-hysteresis sylphons and the supply regulator valve are capable of moving as a single unit, whereby using the first and second pairs of non-hysteresis sylphons to control the aforementioned valve clearances substantially eliminates dry friction between the flow regulator valve 16 and the flow regulator nozzle, and substantially eliminates dry friction between the pressure regulator valve and the pressure regulator nozzle.

20. The automatic vacuum pressure standard of claim 19 wherein the first and second pairs of non-hysteresis sylphons are implemented using at least one of thin metal elements, bellows, membranes, diaphragms with collapsible walls, movable diaphragms, expansible chambers, or aneroid capsules.

* * * * *